Figure 1:
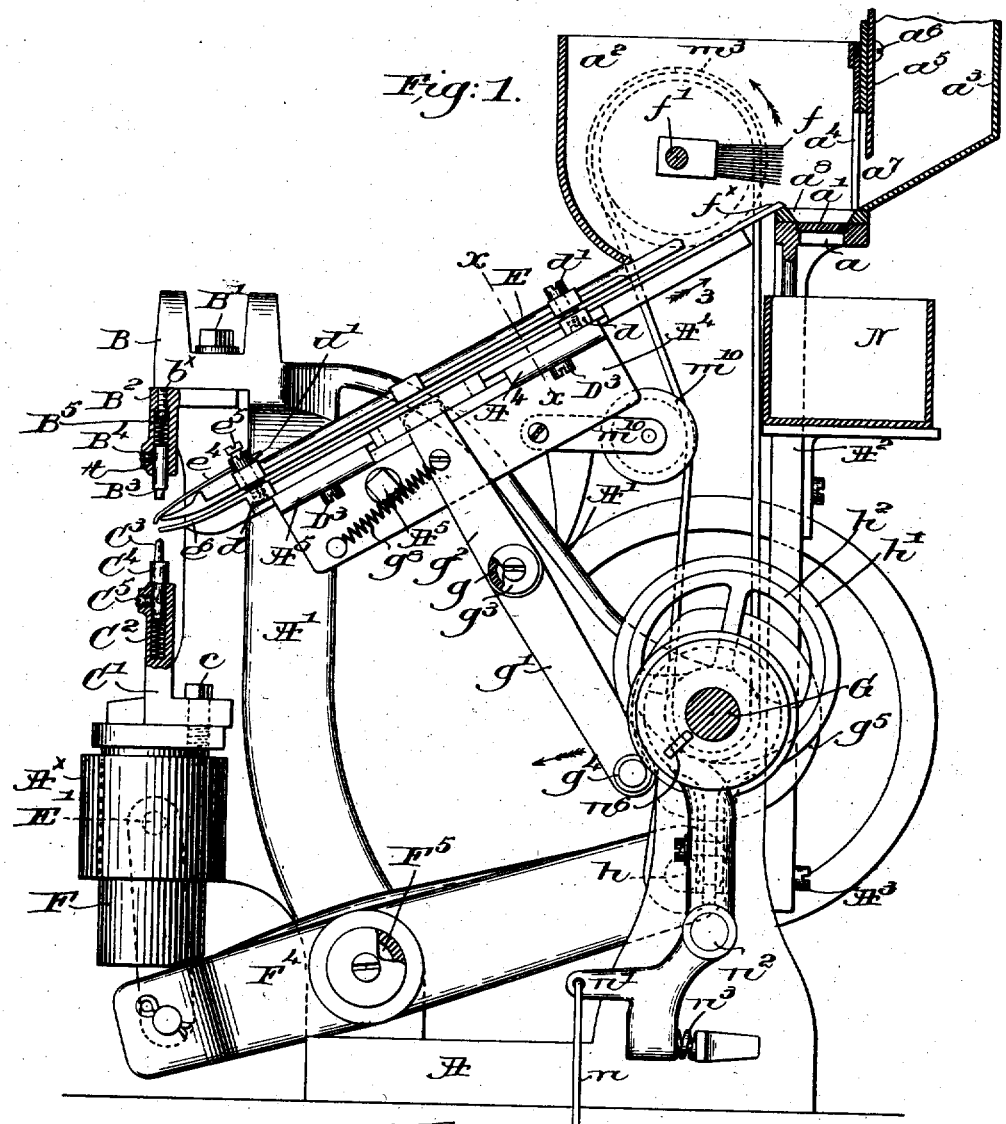

No. 11,782.

Reissued Oct. 31, 1899.

G. KNIGHT.

GANG EYELETING MACHINE.

(Application filed Aug. 19, 1899.)

3 Sheets—Sheet 1.

Witnesses,
Edward F. Allen
Guy E. McLean.

Inventor,
George Knight,
by Lowsley & Gregory
Attys.

No. 11,782. Reissued Oct. 31, 1899.
G. KNIGHT.
GANG EYELETING MACHINE.
(Application filed Aug. 19, 1899.)
3 Sheets—Sheet 2.
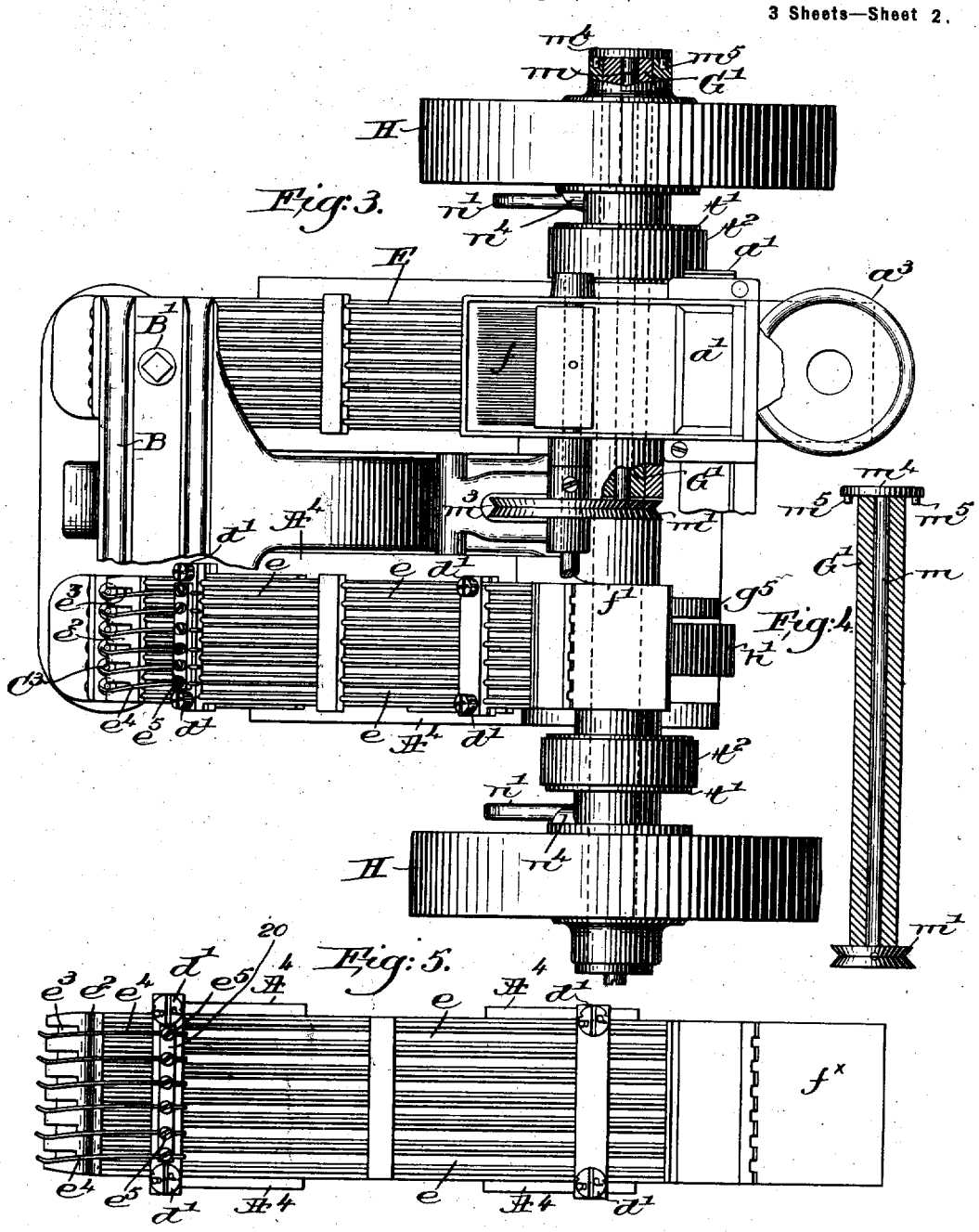
Witnesses,
Edward F. Allen.
Guy E. McLean.
Inventor,
George Knight,
by Crosby & Gregory
Atty's.

No. 11,782.

Reissued Oct. 31, 1899.

G. KNIGHT.

GANG EYELETING MACHINE.

(Application filed Aug. 19, 1899.)

3 Sheets—Sheet 3.

Witnesses,
Edward G. Allen.
Guy E. McLean.

Inventor;
George Knight,
by Lemsby & Gregory
Atty's.

UNITED STATES PATENT OFFICE.

GEORGE KNIGHT, OF BROCKTON, MASSACHUSETTS.

GANG EYELETING-MACHINE.

SPECIFICATION forming part of Reissued Letters Patent No. 11,782, dated October 31, 1899.

Original No. 627,341, dated June 20, 1899. Application for reissue filed August 19, 1899. Serial No. 727,808.

*To all whom it may concern:*

Be it known that I, GEORGE KNIGHT, a citizen of the United States, residing at Brockton, county of Plymouth, State of Massachusetts, have invented an Improvement in Gang Eyeleting-Machines, of which the following description, in connection with the accompanying drawings, is a specification, like letters and figures on the drawings representing like parts.

This invention has for its object the production of an improved eyeleting-machine whereby a series of eyelets may be set simultaneously in any article wherein it is desired to employ eyelets.

My machine is particularly desirable for use in the setting of eyelets in boots and shoes.

In the machine to be herein described there are shown two raceways, each raceway presenting a plurality of grooves, so that each is adapted to guide a plurality of series of eyelets, so that as many eyelets as it is desired to set in one side of a shoe-opening may be set simultaneously or at one operation, and by using two such raceways the eyelets may be taken from one or the other, as may be desired. The raceways have imparted to them a longitudinal motion after the usual plunger coöperating with the bottom set has entered the series of eyelets to be set, they being held at the lower end of one of the raceways, said longitudinal motion operating to detach the series of eyelets to be set from said raceway, and during such motion of each raceway the upper end of the bottom plate thereof slides back and forth in or with relation to the hopper containing the eyelets, they being supplied thereto from a reservoir. I have herein provided means for the quick discharge from the hopper of the eyelets left therein whenever for any reason the eyelets want to be changed from one to another size or kind. The top plate of each raceway is herein shown as composed of preferably a metallic casting having a series of longitudinal grooves, each series receiving the shanks of the eyelets of the several series to be set, the heads or flanged parts of said eyelets moving between the under side of the bars separating the said grooves and the upper side of the bottom plate referred to, and in order that the apparatus may be adapted to eyelets of different character or thickness of flange I have made the top plate adjustable vertically—*i. e.*, I have combined with said top plate a headed screw—and between the under side of the top plate and the upper side of the bottom plate I have placed springs which normally act to lift the top plate, and by turning said screws a certain distance, which may be indicated by score-marks on the screws which may be brought into position to tally with score-marks on the top plate, the top plate may be adjusted to a nicety to properly receive the eyelet of any particular thickness, style, or shape.

By providing the raceways and top and bottom sets in duplicate it is possible on the same machine to quickly and readily provide both sides of a shoe-top with eyelets.

Figure 2:
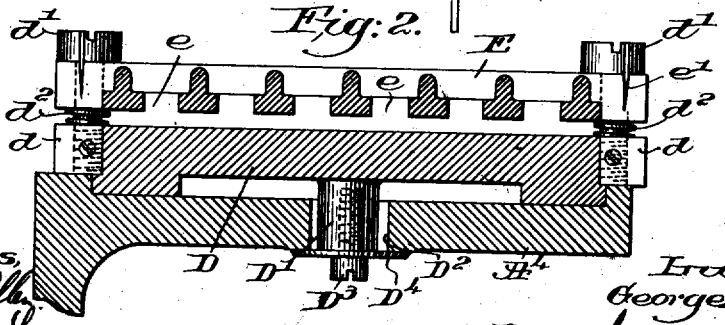
Figure 6:
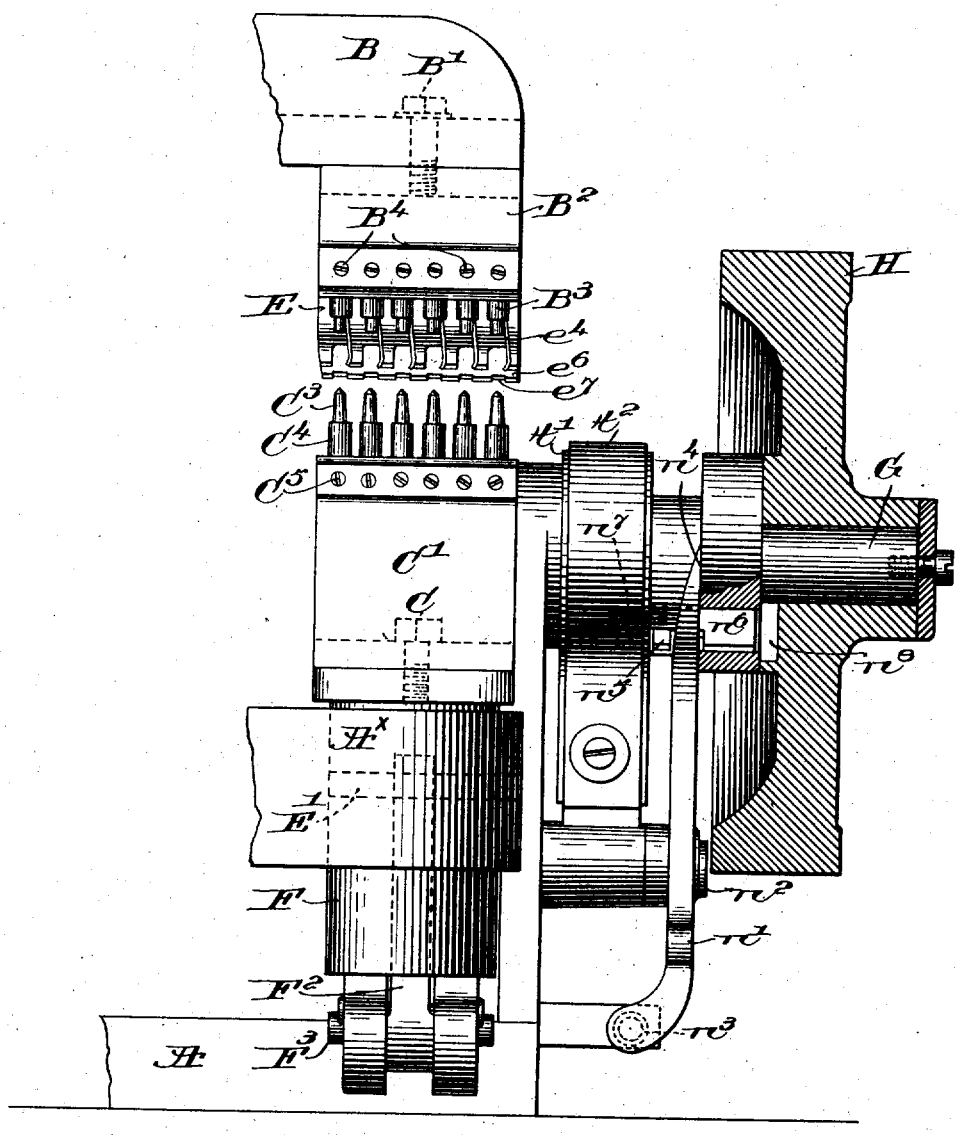

Figure 1 represents in side elevation and partial section an eyeleting-machine embodying this invention, the main shaft being cut off at a point immediately within the loose constantly-driven pulley, the hopper and reservoir being shown only in part and in longitudinal section and the holders or heads receiving the top and bottom sets being also broken out to better illustrate the same. Fig. 2 is an enlarged section in the line $x\,x$, Fig. 1. Fig. 3 is a partial top or plan view of the entire machine shown in Fig. 1, a part of the framework being, however, broken away to show entirely in top view one of the raceways, the hopper and reservoir coöperating with such set being also omitted. Fig. 4 is a detail to be referred to. Fig. 5 shows in plan view, somewhat enlarged, one of the raceways, said figure showing both the top and bottom plate. Fig. 6 is a detail showing one of the raceways, together with the main shaft and some of the parts coöperating therewith.

The framework of the machine consists, essentially, of a foot A, a braced upright bounded between the lines A′ A′, and a standard $A^2$, connected thereto by a suitable screw $A^3$, and guideways $A^4$, bolted to the upright A′ by suitable bolts $A^5$.

The upper left-hand portion of the framework A′ has a projecting ribbed cross-head B, to which is secured by suitable screws B′ suitable like top-set carriers $B^2$, said carriers being bored to receive in them the top sets $B^3$, the shanks of said top sets being held frictionally in said carriers by means of suitable set-screws $B^4$, which act on suitable washers $t$, of leather, while springs $B^5$, controlled as to their strength by screws $b^\times$, acting against them, bear on the top sets, (see Fig. 1,) thereby enabling them to yield, if need be, to varying thickness of work.

The framework A′ has ears $A^\times$, which receive sliding cross-heads F, upon the upper end of which are attached, by a suitable set-screw C, the bottom-set carriers C′, they being bored to receive first a spiral or other spring $C^2$ and then the sliding eyelet-engaging plungers $C^3$ and the bottom sets $C^4$, each bottom set being firmly secured in said carrier C′ by a suitable set-screw, as $C^5$, the springs $C^2$, acting each upon the lower end of one of the series of plungers $C^3$, normally keeping them in their elevated position, as represented in Fig. 1.

The guideways $A^4$, there being two such, one in each half of the machine, are suitably grooved (see Fig. 2, where one of said guideways is shown in cross-section) to receive the bottom plate D for one of the sets of raceways, said bottom plates having extended downwardly therefrom preferably two like legs D′, each leg being extended through a suitable slot $D^2$ in the guideway, and a suitable headed screw $D^3$ is extended through a washer $D^4$ and entered into a tapped hole in the leg, such construction enabling the bottom plate to be reciprocated longitudinally to a limited extent in the guideway.

Viewing Fig. 2, which is a section in the line $x$ looking to the right, it will be seen that the bottom plate has at each side a suitable lug $d$, which is tapped to receive the threaded lower end of a headed adjusting-screw $d'$, there being four such screws used in like lugs. These screws are passed through suitable holes in parts of the top plates E, there being herein shown two such top plates, each containing a series of grooves—viz., six grooves—it being contemplated that the apparatus herein shown shall set simultaneously at one operation six eyelets, and to economize in the manufacture of this class of machine I have made it so that I am enabled to operate two raceways and top and bottom sets with the use of one and the same framework. The grooves in the top plate are represented by $e$, and in these grooves stand the shanks of the eyelets to be set, the flanged parts of the eyelets lying on the top of the bottom plate, and these grooves by being exposed enable the operator to readily see that they are properly filled with eyelets. I have interposed suitable springs $d^2$ between the under side of the top plate and the top of the bottom plate, said springs normally acting to lift the top plate, and in order that said top plate may be adjusted at the proper distance toward or from the top of the bottom plate to adapt the apparatus to different eyelets—as, for instance, to brass eyelets or to so-called "perfection" eyelets—I have cut upon each of the screws $d'$ two notches B and P, and by turning said screws so as to bring the notch B in line with the notch $e'$ in the top plate the adjustment will be just right for brass eyelets; but by turning the screw so that the notch marked P comes into registration with the said notch $e'$ then the apparatus will be adapted for the so-called "perfection" eyelet, an eyelet that is usually covered. The top plate has at its lower end or terminal a foot $e^2$, having a series of notches, as $e^3$, said notches being in line with the openings $e$, and coöperating with each of these notches in the said foot I have arranged a spring or yielding finger or stop $e^4$, it having its end turned to partially surround the lowermost eyelet of the series of eyelets in each of the grooves of the raceway top plate, said springs or fingers entering holes in a cross-bar 20, suitably secured to the upper side of the top plate, each of said springs or fingers being held in adjusted position by means of a set-screw $e^5$. The bottom plate at its lower end (see Figs. 1 and 6) has a foot $e^6$, and said foot has a series of notches $e^7$ to permit the plungers $C^3$ as they rise to pass through said slots and enter the open ends of the eyelets.

The standard $A^2$ has at its upper end a throat $a$, which is closed by a slide $a'$, which may be engaged and drawn out of the grooves in said throat when it is desired to discharge all the eyelets from the hopper $a^2$, the withdrawal of the said slide entirely opening the throat $a$. The hopper $a^2$ has connected with it a reservoir $a^3$. (Partially shown in Fig. 1 and in top view, Fig. 3, at the left.) Said reservoir has an opening $a^4$ leading therefrom into the hopper, and it has a door or slide $a^5$, controlled as to its position by a suitable set-screw $a^6$ in a slot therein, so that said door may be raised and lowered at the proper time to make the space $a^7$ below it (see Fig. 1) less or more, according to the number of eyelets it is desired shall roll from the reservoir onto the slide $a'$ and pile up thereon in the groove $a^8$ above said slide. The reservoir, hopper, and door are substantially the same as in my Patent No. 627,340, dated June 20, 1899, and so is also the shaft $f'$, having the brush-like agitator $f$, it rotating in the direction of the arrow on it in Fig. 1 and acting to sweep back and upwardly the eyelets coming out or falling down upon the extension $f^\times$ of the bottom plate D, said extension when either of the two raceways stand in their position to receive the plungers $C^3$ occupying the position represented in Fig. 1, and the upper end of the top plate of the raceway also stands within the hopper as in said figure.

The framework A′ has a stud $g$, which receives over it the hub of a two-armed lever $g'$ $g^2$, a screw $g^3$, inserted through a washer and screwed into said stud, keeping said two-armed lever in position. The upper end $g^2$ of this two-armed lever enters a slot or notch at the under side of the bottom plate of the raceway, and the under arm $g'$ of this lever has a roller or other stud $g^4$, which is acted upon by a cam $g^5$, fast on the main shaft G, said cam in its rotation acting on said roller and moving the lever $g'$ $g^2$ in the direction of the arrow near the lower end of said lever, such movement of said lever causing the bottom and top plates of the raceway to move in the direction of the arrow 3, Fig. 1. When the raceway is so moved, it will be supposed that the plungers $C^3$ stand each in an endmost eyelet of the series of eyelets in each of the series of grooves $e$, and such movement of the raceway effects the detachment therefrom of the row of eyelets next to be set, and at the same time the upper end $f^\times$ of the bottom plate of the raceway plunges into the mass of eyelets resting on the slide $a'$ and in the groove $a^3$, so that series of said eyelets get onto said bottom plate and come down against the upper end of the top plate, and those eyelets that slide down the bottom plate with their shanks up enter the grooves $e$ at the upper ends of the top plate, the surplus eyelets being thrown back by the brush $f$. Herein the series of bottom sets have imparted to them a vertical motion in the following manner, viz: Each sliding cross-head F, there being two such, has a suitable pin E', which receives a link $F^2$, attached by a pin $F^3$ to one end of a lever $F^4$, mounted on a suitable stud $F^5$, extended from the upright part A' of the framework, said lever having jointed to it at its other end by a pin $h$ (see dotted lines, Fig. 1) one end of an eccentric-strap $h'$, which surrounds an eccentric $h^2$, fast on the shaft G.

In the machine herein represented there are two shafts G G', each in line with the other, and each of said shafts has loosely mounted upon it a continuously-moving driving or clutch pulley H H', and the shafts have each a like cam $g^5$ and eccentric $h^2$. If it is desired to use but one half of the machine or one series of sets at one time, of course the pulley H of the half not to be used will be kept uncoupled from the shaft G. A suitable spring $g^8$, connected with the lever $g'$ $g^2$, acts normally to keep the roller-stud $g^4$ in contact with the cam $g^5$, and said spring also serves to keep the series of raceways in their lower or normal position, as represented in Fig 1. The rotation of the shaft G causes the eccentric $h^2$ to turn the lever $F^4$ and raise the cross-head F, and in so doing the plungers $C^3$ first enter the series of eyelets then at the ends of the grooves of each raceway, and after the said plungers have fully entered the said eyelets the raceway is moved in the direction of the arrow 3, as stated, thus effecting the detachment of the series of eyelets, and in further upward movement of the cross-head the plungers meet the lower ends of the series of top sets, said plungers and the eyelets thereon having gotten into position in the holes made in the shoe top or upper, and finally in the further rise of the cross-head the plungers stop, while the springs $c^2$ yield and the bottom sets rise and, acting on the flanged parts of the eyelets, force the ends of their shanks firmly against the shoulders of the top sets, curling or flanging said shanks and fixing the same firmly in the shoe-upper or other article in which the eyelets are being set, said springs $B^5$ yielding somewhat if the thickness of the stock demands.

It has been herein stated that there are two shafts G G' in substantially the same line; but one of these shafts—viz., that one herein shown at the left-hand side of the machine and marked G' to designate it from the other one, G—is hollow, (see Fig. 4,) it receiving through it a shaft $m$, having at its inner end a small sheave or pulley $m'$, which receives about it a belt $m^2$, (see Fig. 1, dotted lines,) which surrounds a grooved pulley $m^3$ on the shaft $f'$, carrying the brush $f$, said shaft $f'$ operating two brushes, one for each of the two hoppers. The shaft $f'$ is represented as located in a vertical plane substantially above the upper end of the top plate E of the raceway, and the brush $f$, carried by said shaft, is of such length and is rotated in such direction that the brush meets any eyelets which are caught or improperly lodged in the upper end of the raceway-grooves and sweeps said eyelets upwardly away from said grooves, together with the eyelets resting upon the upper end of the bottom plate of the raceway, and in this way the brush $f$, it acting intermittingly, clears periodically the upper ends of the throats leading into the grooves of the raceway and also clears the table or plate $f^\times$, which receives the eyelets from the pile above on their way down to enter the grooves of the raceway. In all other intances known to me wherein a brush has been used to act upon eyelets, button-fasteners, &c., said brush has been employed to sweep the eyelets or button-fasteners toward and so that they may enter the grooves of the raceway; but herein it will be noticed that the brush rotates in a direction to discharge and take away from the upper ends of the raceway the eyelets, this action being intermitting.

In Fig. 1 I have shown a belt-tightener $m^{10}$, it being a sheave hung upon a movable arm $m^{12}$. Whenever it is desired to change from one kind of eyelets to another, the operator merely withdraws the slide $a'$, and the continuously-rotating brushes will sweep all the eyelets up over the upper end $f$ of the bottom plate, and they will pass through the throat $a$ into any receptacle placed there for the purpose, I having shown one form of receptacle by the letter N, Fig. 1.

The outer end of the shaft $m$ has a head $m^4$, provided with pins or dogs $m^5$, which enter recesses (see Fig. 3) in the hub of the continuously-rotating driving-wheel H' at that end of the machine, so that said driving-wheel, it being kept continuously in motion, always acts to rotate the brushes for the purpose described.

It will be understood that the shafts G G′ are rotated once and then automatically stopped, with the raceways in their lowermost positions, as in Fig. 1, and the operator then takes the punched work which is to receive the eyelets and slips the punched holes onto the lower ends of the top sets $B^3$, and thereafter the plungers and lower sets rise, the plungers having upon them the eyelets to be set, and the lower sets, acting on the eyelets, push them into the punched holes in the work and put the ends of the top sets in said holes, upsetting the eyelet properly between the acting ends of the two sets.

To start the machine in operation for one cycle, the operator will put his foot on a suitable treadle (not shown) at the lower end of a suitable rod $n$, Fig. 6, connected with lever $n'$, pivoted at $n^2$ and normally acted upon by a spring $n^3$ to keep the upper end of said lever pressed toward the main shaft G or G′ of the machine, and will turn said lever $n'$ in opposition to the said spring, thus removing its inclined upper end $n^4$ away from the shaft and away from the lug $n^5$ of a spring-pressed dog $n^6$, said dog being acted upon by a spring $n^7$, chiefly concealed in a hole in a hub $t'$, fast on the shaft, said spring acting to move the said dog to the right from the position Fig. 6 far enough to enter the notch $n^8$ in the inner end of the hub of the driving-pulley H, so that said pulley in the engagement with said dog immediately rotates the shaft G or G′, whichever one it is desired to start into operation, and as soon as the shaft starts the operator will remove his foot from the treadle referred to, letting the spring $n^3$ act to move the inclined upper end $n^4$ of the lever $n'$ again toward the shaft, so that as the projection $n^5$ in the rotation of the shaft meets the inclined end of the said lever the dog $n^6$ will be withdrawn from a notch $n^8$, as in Fig. 6, and thereafter the pulley H will continue to rotate until the lever $n'$ is again moved to effect the release of the dog that it may engage the pulley.

In my Patent No. 627,340 of June 20, 1899, I have shown a machine for setting eyelets in series, and therein the raceway-grooves are formed in separate bars adjustable one with relation to the other, and each one of the top and bottom sets are also contained in separate blocks, adjustable one with relation to the other, and said machine has the capacity by or through the adjustment of said individual raceways and the said top and bottom sets of setting the eyelets more or less out of a straight line, as may be desired.

The brush $f$, which rotates about a horizontal axis extended transversely across the upper end of the raceway-plate, constitutes a device which coöperates in its rotation simultaneously with the upper end of the raceway-plate to remove all the eyelets not already in the grooves of the raceway-plate.

By the term "intermittingly-acting brush" I mean a brush which is not composed of a shaft inclosed entirely about its periphery with bristles, for such a brush, if used and rotated in the directions herein claimed and stated, would prevent any eyelets whatever from entering the raceway-groove; but by providing the shaft $f'$ with bristles at only a part of its circumference it will be seen that the bristle or effective part of the brush acts only intermittingly, it sweeping during its rotation all the eyelets up away from the receiving ends of the eyelet-grooves, the said brush thereafter remaining out of contact with the raceway long enough to let a new lot of eyelets drop down to and meet the upper end of the upper plate of the raceway, and some of said eyelets enter the grooves, and those which do not enter the grooves properly are immediately swept back again and another lot of eyelets are enabled to get a new start.

Having described my invention, what I claim as new, and desire to secure by Letters Patent, is—

1. An eyeleting-machine containing the following instrumentalities, viz: a raceway composed of a bottom plate and an independent top plate located above it, said top plate having a plurality of grooves to receive and guide the bodies of eyelets, the flanges of said eyelets sliding in the open space between it and the under side of said top plate, and spring-stops having their ends normally standing across the path of travel of the eyelets in each of said grooves, substantially as described.

2. In an eyeleting-machine, the following instrumentalities, viz: a raceway composed of a bottom plate and an independent top plate located above it and provided with a plurality of grooves to receive and guide the bodies of eyelets leaving the flanges of said eyelets to rest upon the upper side of the bottom plate and slide in the open space between said bottom and top plates, and means to adjust said top plate vertically with relation to the said bottom plate, to adapt it to eyelets of different grades, substantially as described.

3. In an eyeleting-machine, a raceway composed of a bottom plate, a top plate presenting a series of open grooves, the said bottom and top plates having at their lower ends a series of open slots, of means to arrest the endmost eyelets of each series of eyelets in the grooves of the top plate in position over or in line of movement of the bottom sets, and a series of bottom and top sets and plungers coöperating therewith to enter the eyelets, and means to operate the sets to set the eyelets.

4. In an eyeleting-machine, a guideway, a raceway, composed of a broad bottom plate and a top plate having a series of grooves to receive a series of eyelets, a hopper to receive the upper end or extension of the bottom plate, and means to move said bottom and top plates simultaneously in the said guideway and in the said hopper, substantially as described.

5. In an eyeleting-machine, a raceway, a hopper having an open throat located at or above the upper end of said raceway, a slide to close said throat, said slide supporting the pile of eyelets on their way to said raceway, means coöperating with said raceway and extended across the upper ends thereof to remove eyelets therefrom onto said slide, whereby by the movement of said slide to open said throat said means may effect the discharge automatically through the said open throat of all unused eyelets.

6. A hopper having an open rear wall, a shelf located within said hopper near the said opening, an independent reservoir to supply eyelets to said hopper, said eyelets being fed onto said shelf in a pile, and an agitator, combined with a raceway having its inclined end located in said hopper, and means to move said raceway to enter the eyelets deposited in a pile on the said shelf, the agitator sweeping back from the said raceway any eyelets that do not properly enter the grooved portions thereof, substantially as described.

7. In an eyeleting-machine, a raceway adapted to receive and guide a plurality of series of eyelets, a hopper, a brush mounted in said hopper and coöperating with the entire plurality of series of grooves containing said eyelets, and a continuously-moving driving-pulley loose on the main shaft of the eyeleting-machine, combined with means connecting said loose pulley with the shaft of said brush, it occupying a position transverse to the raceway-grooves, whereby said brush may be rotated continuously after the machine has been stopped to effect the discharge of eyelets from the hopper, substantially as described.

8. In an eyeleting-machine, a hopper and a connected reservoir, a gate or opening to permit eyelets to pass from the reservoir into the hopper, a throat having a slide to receive the eyelets leaving the reservoir and coming into the hopper, a raceway presenting a plurality of grooves to receive a plurality of series of eyelets, combined with a brush having its shaft located transversely to the grooves of the raceway, and means to rotate said shaft that the brush may act upon the eyelets coming onto the raceway, and discharge from the raceway eyelets which do not properly enter the grooves, substantially as described.

9. In an eyeleting-machine, a raceway composed of a bottom plate and a separate top plate presenting a series of open grooves for the reception of the bodies of the eyelets, the flanges of said eyelets entering the space between the under side of the top plate and the top of the bottom plate, substantially as described.

10. In an eyeleting-machine, a raceway composed of a bottom plate, and separate top plate presenting a series of grooves for the bodies of the eyelets, the flanges of said eyelets entering the space between the top of the bottom plate and the bottom of the top plate, and means to adjust said top plate vertically with relation to said bottom plate, substantially as described.

11. In an eyeleting-machine, a raceway presenting a plurality of grooves to receive eyelets, a hopper located at the upper end of the raceway, a brush located transversely to the raceway-grooves, and means to actuate said brush and cause it to act upon and sweep upwardly the eyelets at the upper end of the raceway away from the entering-grooves thereof, said brush intermittingly clearing the eyelets away from the upper end of the raceway leaving the eyelets a clear space to descend and enter the raceway-grooves, substantially as described.

12. In an eyeleting-machine, a raceway composed of a bottom and top plate, said top plate being grooved at its under side for the entrance of the shanks of eyelets, the receiving end of said top plate being located at a distance below the upper end of the bottom plate of the raceway, an intermittingly-operating brush carried by a shaft located above the upper end of said raceway and transverse to its grooves, and means to rotate said brush in but one direction that it may act intermittingly to sweep the eyelets from the upper end of the top plate of said raceway upwardly along the bottom plate of said raceway, said brush in its action contacting with both the bottom and top plates of the raceway and acting intermittingly to sweep all the eyelets which have not properly entered the raceway-grooves upwardly away from the entrance to said grooves, thereby permitting a fresh set of eyelets to immediately descend on the bottom plate of the raceway to the entrance-grooves of the top plate of the raceway, substantially as described.

In testimony whereof I have hereunto signed my name in the presence of two subscribing witnesses.

GEORGE KNIGHT.

Witnesses:
GEO. H. MAXWELL,
JOHN C. EDWARDS.